US007650626B2

(12) United States Patent
Suh (10) Patent No.: US 7,650,626 B2
(45) Date of Patent: Jan. 19, 2010

(54) SERVICE SYSTEM OF THUMBNAIL IMAGE AND TRANSMITTING/RECEIVING METHOD THEREOF

(75) Inventor: Jong Yeul Suh, Seoul (KR)

(73) Assignee: LG Electronics, Inc., Seoul (KR)

( * ) Notice: Subject to any disclaimer, the term of this patent is extended or adjusted under 35 U.S.C. 154(b) by 717 days.

(21) Appl. No.: 10/930,934

(22) Filed: Aug. 30, 2004

(65) Prior Publication Data
US 2005/0048916 A1  Mar. 3, 2005

(30) Foreign Application Priority Data
Aug. 30, 2003  (KR)  .................... P10-2003-0060556

(51) Int. Cl.
*H04N 7/16* (2006.01)
(52) U.S. Cl. ........................................ 725/139; 725/54
(58) Field of Classification Search ................ 345/420, 345/435, 473; 725/56, 57, 58, 59, 38, 60, 725/113; 455/39, 73; 379/142.16, 671; 375/240.25
See application file for complete search history.

(56) References Cited
U.S. PATENT DOCUMENTS

| | | | | |
|---|---|---|---|---|
| 6,005,562 A | * | 12/1999 | Shiga et al. ................. 715/721 |
| 6,124,864 A | * | 9/2000 | Madden et al. ............. 345/473 |
| 6,449,352 B1 | * | 9/2002 | Takahashi et al. ........ 379/142.16 |
| 6,751,800 B1 | * | 6/2004 | Fukuda et al. ................. 725/40 |
| 6,966,065 B1 | * | 11/2005 | Kitazato et al. ............. 725/116 |
| 6,990,676 B1 | * | 1/2006 | Proehl et al. ................... 725/40 |
| 7,251,790 B1 | * | 7/2007 | Drucker et al. .............. 715/838 |
| 2002/0056102 A1 | * | 5/2002 | Dillon et al. ................... 725/39 |
| 2002/0166122 A1 | * | 11/2002 | Kikinis et al. ................. 725/56 |
| 2003/0026594 A1 | * | 2/2003 | Shiiyama ...................... 386/69 |
| 2005/0123272 A1 | * | 6/2005 | Kanai et al. ................... 386/52 |

OTHER PUBLICATIONS

Kressin, MS, "Transmitting Thumbnail Preview Images in a Video Stream", May 5, 1997, IBM, vol. 40 No. 05, pp. 1-3.*

* cited by examiner

*Primary Examiner*—Andrew Y Koenig
*Assistant Examiner*—Junior O Mendoza
(74) *Attorney, Agent, or Firm*—Lee, Hong, Degerman, Kang & Waimey (57) ABSTRACT

The present invention provides a service system of a thumbnail image and transmitting/receiving method thereof, by which a thumbnail image service of high quality of service and various application services can be provided to a user and by which a broadcasting station or thumbnail image service provider produces to transmit the thumbnail image to reduce a price of a broadcast receiver. The present invention includes a transmitting unit generating at least one thumbnail image for a specific program to transfer on a transport channel and a receiving unit demodulating the transferred at least one thumbnail image to display or store.

22 Claims, 5 Drawing Sheets

SERVICE SYSTEM OF THUMBNAIL IMAGE AND TRANSMITTING/RECEIVING METHOD THEREOF

This application claims the benefit of the Korean Application No. P2003-60556 filed on Aug. 30, 2003, which is hereby incorporated by reference.

BACKGROUND OF THE INVENTION

1. Field of the Invention

The present invention relates to a digital broadcasting service, and more particularly, to a service system of a thumbnail image and transmitting/receiving method thereof.

2. Discussion of the Related Art

Generally, a thumbnail image is implemented by displaying a specific frame of a moving picture to be smaller than its original size for summarizing, browsing, or searching a received or stored broadcast program. Namely, the thumbnail image provides implicative information to a user using a still image instead of a moving image. The thumbnail image enables to summarize contents of a video, which is received from a broadcasting station or recorded in a personal video recorder (PVR) of a digital TV, via several small pictures. And, the thumbnail image enables to generate a key frame for video indexing or a representative image for the purpose of a preview or digest for a program in a program guide. Hence, the thumbnail image is applicable to various fields of use.

Yet, the current system adopts a method of generating a thumbnail image via receiver such as DTV, set-top box, PVR, and the like instead of transmitting a thumbnail image from a broadcasting station. Hence, the receiver needs a separate thumbnail image generator to generate a thumbnail image.

A thumbnail image generator generally adopts a method of generating thumbnail image for the I-picture feasible for extraction of thumbnail image from an inputted video frame. This is to minimize hardware necessary for the thumbnail image generation using a DC value of the I-picture only.

However, in order to generate a thumbnail image enabling a user to clearly comprehend the meaning of program contents, the receiver substantially needs additional hardware and software. And, such an implementation needs high complexity and efficiency. Although the thumbnail image provides high quality of service to a user, the configuration of the receiver is considerably complicated as well as a price of the receiver is expensive.

SUMMARY OF THE INVENTION

Accordingly, the present invention is directed to a service system of a thumbnail image and transmitting/receiving method thereof that substantially obviate one or more problems due to limitations and disadvantages of the related art.

An object of the present invention is to provide a service system of a thumbnail image and transmitting/receiving method thereof, by which a thumbnail image service of high quality of service and various application services can be provided to a user.

Another object of the present invention is to provide a service system of a thumbnail image and transmitting/receiving method thereof, by which a broadcasting station or thumbnail image service provider produces to transmit the thumbnail image to reduce a price of a broadcast receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a thumbnail image service system according to the present invention includes a transmitting unit generating at least one thumbnail image for a specific program to transfer on a transport channel and a receiving unit demodulating the transferred at least one thumbnail image to display or store.

Preferably, the transmitting unit includes a thumbnail image generator generating the at least one thumbnail image for the specific program, an encoder encoding the at least one thumbnail image, a multiplexer multiplexing a broadcast stream with a thumbnail image stream of the encoded at least one thumbnail image, and a transmitter transferring the broadcast stream multiplexed with the thumbnail image stream on the transport channel.

More preferably, the broadcast stream multiplexed with the thumbnail image stream is transferred on the transport channel selected from the group consisting of a terrestrial wave, a satellite, and a cable. And, the thumbnail image can be generated by a scene unit of the specific program.

More preferably, each scene of the generated thumbnail image includes a video stream, an audio stream, a thumbnail image stream, and an auxiliary data stream. And, a packet of the thumbnail image stream may include a thumbnail start code field, a program ID field, a scene ID field, and a data filed including the thumbnail image.

More preferably, if the thumbnail image is divided into a plurality of thumbnail image stream packets to be transferred, in a packet including data corresponding to an initial part of the thumbnail image, an image start code indicating that the corresponding data is an initial data transmitted for the thumbnail image and an image header information including information of the thumbnail image are included to be transferred together.

Preferably, the transmitting unit includes a first transfer unit transferring a broadcast stream including the specific program and a scene ID information for the specific program on a first transport channel and a second transfer unit receiving the scene ID information for the specific program to generate the at least one thumbnail information for the specific program, the second transfer unit encoding the at least one thumbnail image to transfer a thumbnail image stream of the encoded at least one thumbnail image on a second transport channel.

More preferably, the first transport channel is selected from the group consisting of a terrestrial wave, a satellite, and a cable. And, the second transport channel is selected from the group consisting of Internet and a private line.

More preferably, the receiving unit includes a system decoder demultiplexing a broadcast stream including the at least one thumbnail image to separate into a video stream, a thumbnail image stream, an audio stream, and an auxiliary data stream, a video decoder decoding the separated video stream and the thumbnail image stream, an audio decoder decoding the separated audio stream, a data decoder decoding the separated auxiliary data stream, and a display unit matching the decoded thumbnail image stream with the corresponding specific program to display.

More preferably, the receiving unit includes a system decoder demultiplexing a received broad cast signal to separate into a video stream, an audio stream, aid an auxiliary data stream, a video decoder decoding the separated video stream, an audio decoder decoding the separated audio stream, a data decoder decoding the separated auxiliary data stream, a thumbnail image decoder decoding a received thumbnail image stream, and a display unit matching to display the decoded thumbnail image stream with the corresponding specific program.

In another aspect of the present invention, in a thumbnail image service system transferring a broadcast signal including a thumbnail image corresponding to a specific program, a thumbnail image receiving method includes the steps of receiving the broadcast signal including the thumbnail image, demultiplexing the broadcast signal into a video stream, an audio stream, a thumbnail image stream, and an auxiliary data stream, decoding the thumbnail image stream, and matching the decoded thumbnail image with the corresponding specific program to display or store.

Preferably, the matching step includes the steps of matching a program ID included in the thumbnail image stream with a program ID of the specific program and matching a scene ID included in the thumbnail image stream with a scene ID of the matched specific program.

In another aspect of the present invention, in a thumbnail image service system transferring a thumbnail image corresponding to a specific program and a broadcast signal including the specific program, a thumbnail image receiving method includes the steps of receiving the thumbnail image and the broadcast signal respectively, demultiplexing the broadcast signal to separate into a video stream, an audio stream, and an auxiliary data stream, decoding the thumbnail image stream and the video stream respectively, and matching the decoded thumbnail image with the specific program of the corresponding video stream to display or store.

Preferably, the program ID and the scene ID included in the thumbnail image stream use a coinciding program ID and a coinciding scene ID for a same program and a same scene, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, if a broadcasting station or service (contents) provider directly provides a thumbnail image, a provider can be provided with the thumbnail image of high quality to correctly comprehend the contents of a corresponding program. Namely, the thumbnail images provided by the broadcasting station or service provider are more diverse than those generated from a PVR device of a receiving side and have excellent image quality. Hence, the present invention is characterized in that a broadcasting station or service provider produces a thumbnail image for a broadcast program to transmit to users via terrestrial wave, satellite, cable, private line, and the like.

Figure 1A:
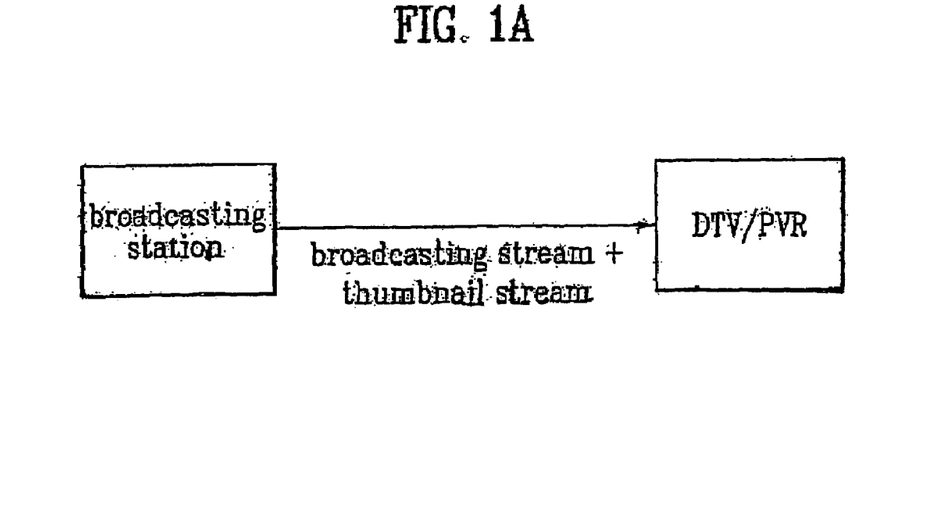
FIG. 1A is a block diagram of a thumbnail image service system according to a first embodiment of the present invention.
Figure 1B:
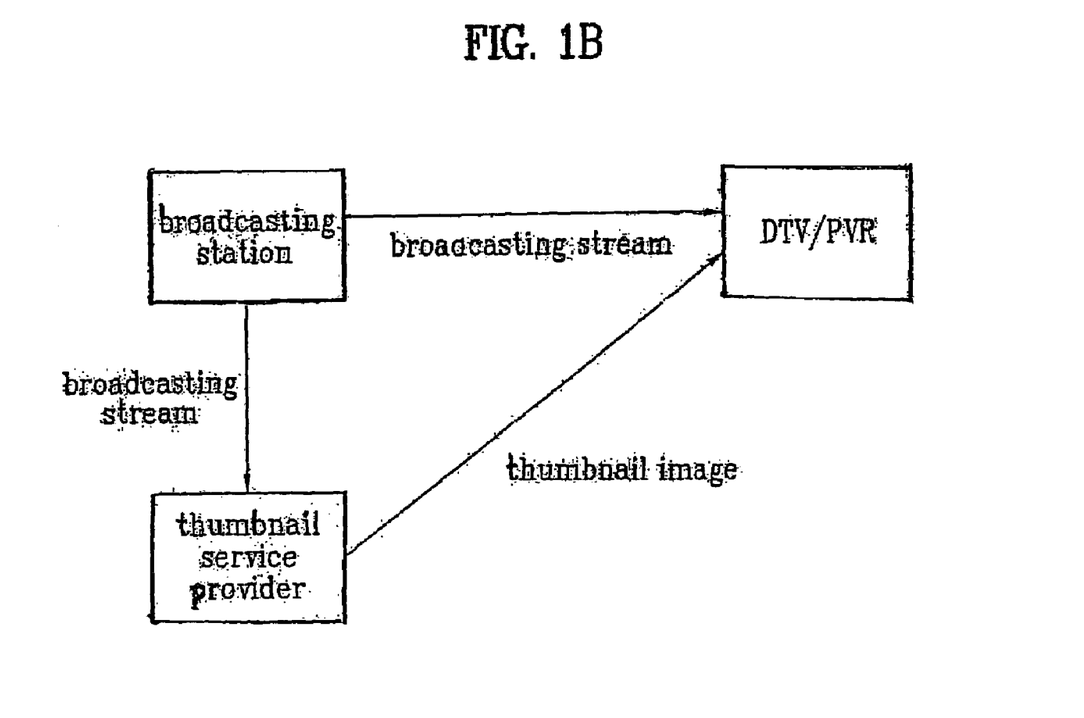
FIG. 1B is a block diagram of a thumbnail image service system according to a second embodiment of the present invention.

FIG. 1A and FIG. 1B are block diagrams of a thumbnail image service system according to the present invention, in which a thumbnail image service method according to the present invention can be performed in a first manner of generating a thumbnail image from a broadcasting station to transmit to viewers or in a second manner of generating a thumbnail image from a service provider to transmit to viewers.

FIG. 1A shows the first manner.

Referring to FIG. 1A, a broadcasting station directly generates to transmit a thumbnail image to a viewer. In doing so, a thumbnail image generating method includes the steps of determining a prescribed number of representative images for a corresponding program and then generates a still image having a size smaller than a resolution of real video data. In this case, the still image becomes the thumbnail image. The generated thumbnail image is encoded into one independent thumbnail image stream. The thumbnail image stream is multiplexed with a broadcast stream to be transmitted. Compared to original video resolution, a size of the real thumbnail image is considerably small. Hence, a corresponding data volume is small as well. Moreover, the considerably limited number of thumbnail images are generated for one program. Hence, even if the thumbnail images are processed into an independent stream, there occurs no meaningful increase in a bandwidth compared to that of the conventional broadcast stream transfer method.

Thus, the broadcasting station providing the thumbnail image includes a thumbnail image generator generating at least one thumbnail image, an encoder encoding the thumbnail image, a multiplexer multiplexing an encoded thumbnail image stream and a broadcast stream with each other, and a transmitter transmitting the broadcast stream multiplexed with the thumbnail image stream on transport channel. And, the broadcast stream multiplexed with the thumbnail image stream can be transmitted on the transport channel of terrestrial wave, satellite, cable, or the like.

FIG. 1B shows the second manner.

Thus, the broadcasting station providing the thumbnail image includes a thumbnail image generator generating at least one thumbnail image, an encoder encoding the thumbnail image, a multiplexer multiplexing an encoded thumbnail image stream and a broadcast stream with each other, and a transmitter transmitting the broadcast stream multiplexed with the thumbnail image stream on transport channel. And, the broadcast stream multiplexed with the thumbnail image stream can be transmitted on the transport channel of terrestrial wave, satellite, cable, or the like.

The thumbnail image service system, as shown in FIG. 1B, includes a first transmitting unit transmitting a broadcast stream including a specific program and scene identification information for the specific program on a first transport channel and a second transmitting unit receiving the scene identification information for the specific program to generate at least one thumbnail image for the specific program and encoding the thumbnail image to transmit an encoded thumbnail image stream on a second transport channel.

In this case, the first transmitting unit is the broadcasting station and the second transmitting unit is the thumbnail image service provider. The first transport channel can be a terrestrial wave, satellite, cable, or the like. And, the second transport channel can be Internet, private line, or the like.

Figure 2:
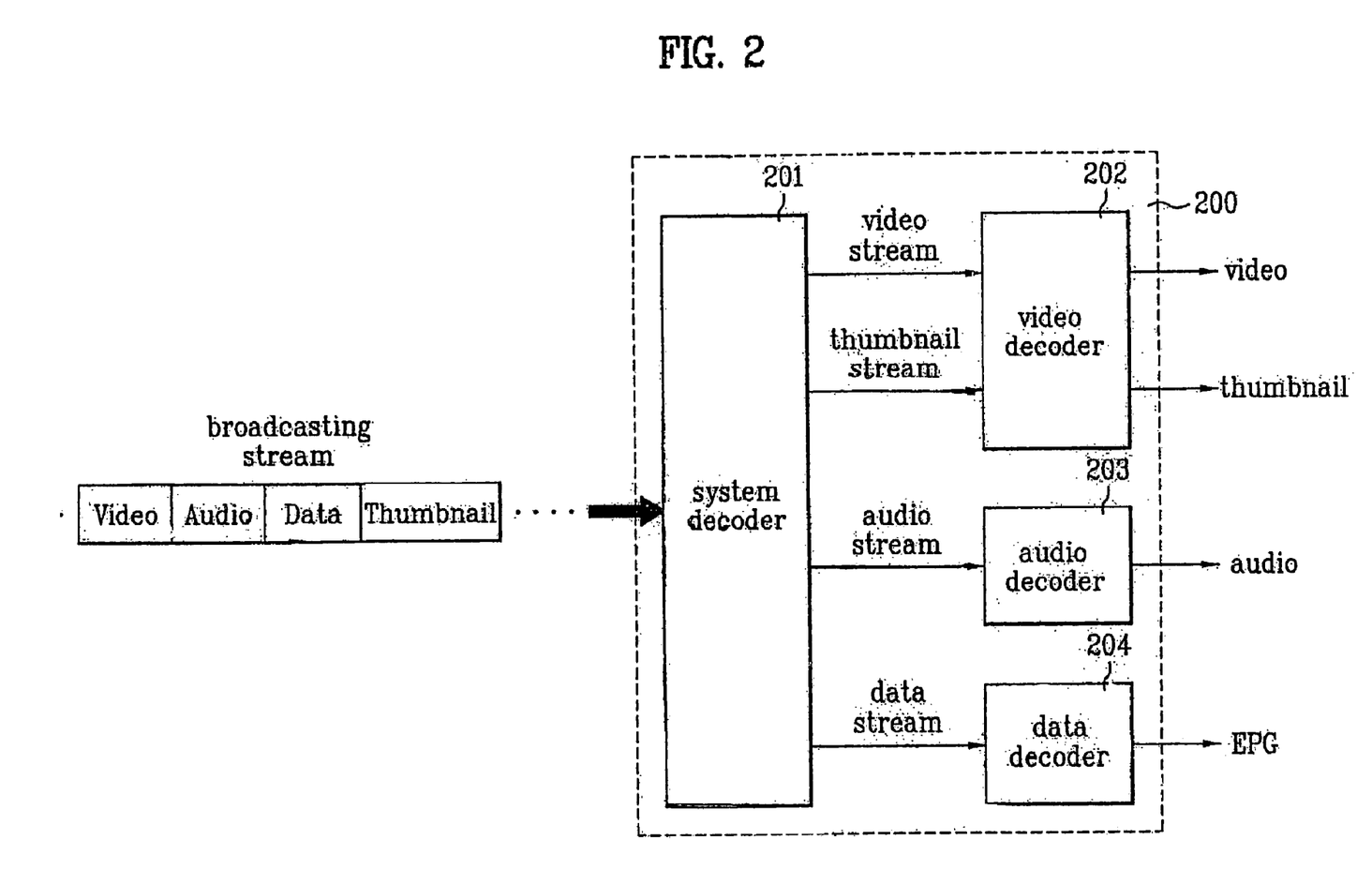
FIG. 2 is a block diagram of a receiver for a thumbnail image service according to the present invention.

FIG. 2 is a block diagram of a receiver for a thumbnail image service according to the present invention, in which a decoding device within DTV or PVR is shown.

Referring to FIG. 2, a decoding device includes a system decoder 201 demultiplexing a received broadcast stream, i.e., a transport stream multiplexed with a thumbnail image, to separate into a video stream, a thumbnail image stream, an audio stream, and an auxiliary data stream, a video decoder 202 decoding the separated video stream and thumbnail image stream, an audio decoder 203 decoding the separated audio stream, and a data decoder 204 decoding the separated auxiliary data stream.

Namely, the video decoder 202 should be able to decode the thumbnail image by decoded the separated thumbnail image stream. Alternatively, the thumbnail image can be decoded by software instead of hardware.

And, the PVR system enables to freely configure OSD (on-screen display) using the transferred thumbnail image. Moreover, in case that the broadcasting station or service provider transfers a data stream of text data for the corresponding program, the PVR system enables to configure OSD having the format that the thumbnail image is appropriately combined with a text. In case that the thumbnail image is displayed on a screen, information of position of the thumbnail image on the screen can be provided by the broadcasting station. And, the OSD may be configured so that the video decoder of the PVR system can arrange the thumbnail image at an arbitrary position on the screen.

FIG. 2 shows the receiving device for receiving the thumbnail image from the broadcasting station in the manner of FIG. 1A. And, a receiving device for receiving a thumbnail image from a service provider in the manner of FIG. B is configured as follows.

Namely, the receiving device includes a system decoder demultiplexing a received broad cast signal to separate into a video stream, audio stream, and auxiliary data streams, a video decoder decoding the separated video stream, an audio decoder decoding the separated audio stream, a data decoder decoding the separated auxiliary data stream, a thumbnail image decoder decoding a received thumbnail image stream, and a display unit matching to display the decoded thumbnail image stream with a specific program.

Figure 3:
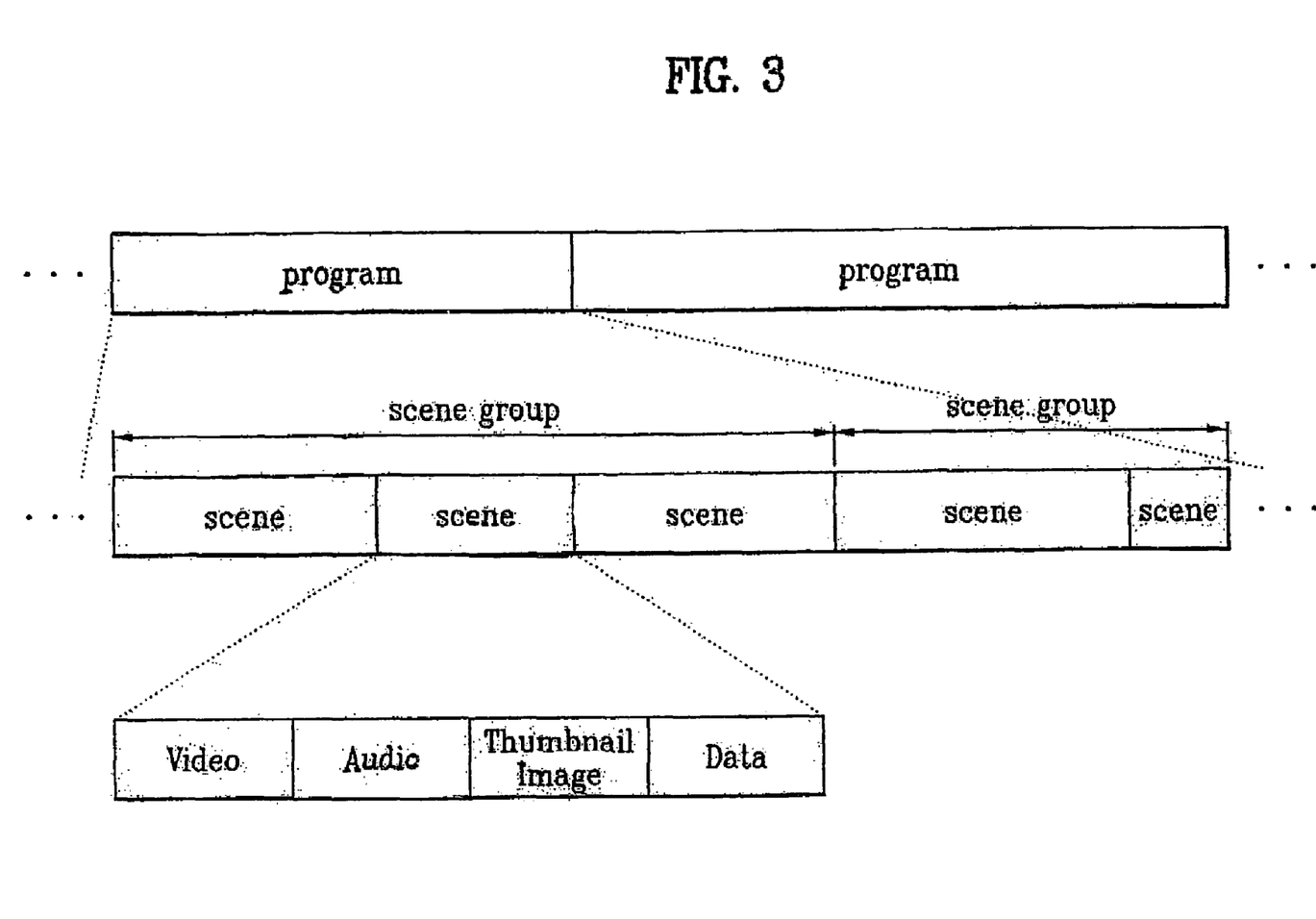
FIG. 3 is a structural diagram of broadcast program data for a thumbnail image service according to the present invention.

FIG. 3 is a structural diagram of broadcast program data for a thumbnail image service according to the present invention.

Referring to FIG. 3, each program is divided into scenes each of which corresponds to a division unit having a meaningful content.

For instance, the scenes of a drama are categorized according to a location change, a content flow change, and the like. A drama having 1-hour running time generally consists of 0 to 60 scenes on an average. Each of the scenes is constructed with a plurality of video frames and audio data for the corresponding sections, thumbnail image data, and other data. In this case, the other data are included in a currently transferred transport stream and include auxiliary information associated with EPG (electronic program guide), program, and the like.

The thumbnail image is generated by scene unit. Namely, the broadcasting station or service provider generates to transfer one thumbnail image per scene.

Alternatively, one thumbnail image can be generated per scene group to be transferred. The scene group is a unit of combining together a plurality of scenes having similar features to each other and is defined by the subject providing the thumbnail image to generate. Namely, the scene group includes at least one or more scenes and each of the scene groups should include at least one or more thumbnail images. In doing so, an entire program may consist of one scene group. Namely, scene information is mandatory for the matching or synchronization between the broadcast and thumbnail image. Yet, the scene group is the information consulted by the subject who generates the thumbnail image. Besides, when a new scene occurs in a broadcast program, scene information should be transferred to enable a DTV or PVR system to recognize that a current section is included in which scene. The scene information is transferred via the thumbnail image stream or the data stream.

Figure 4:
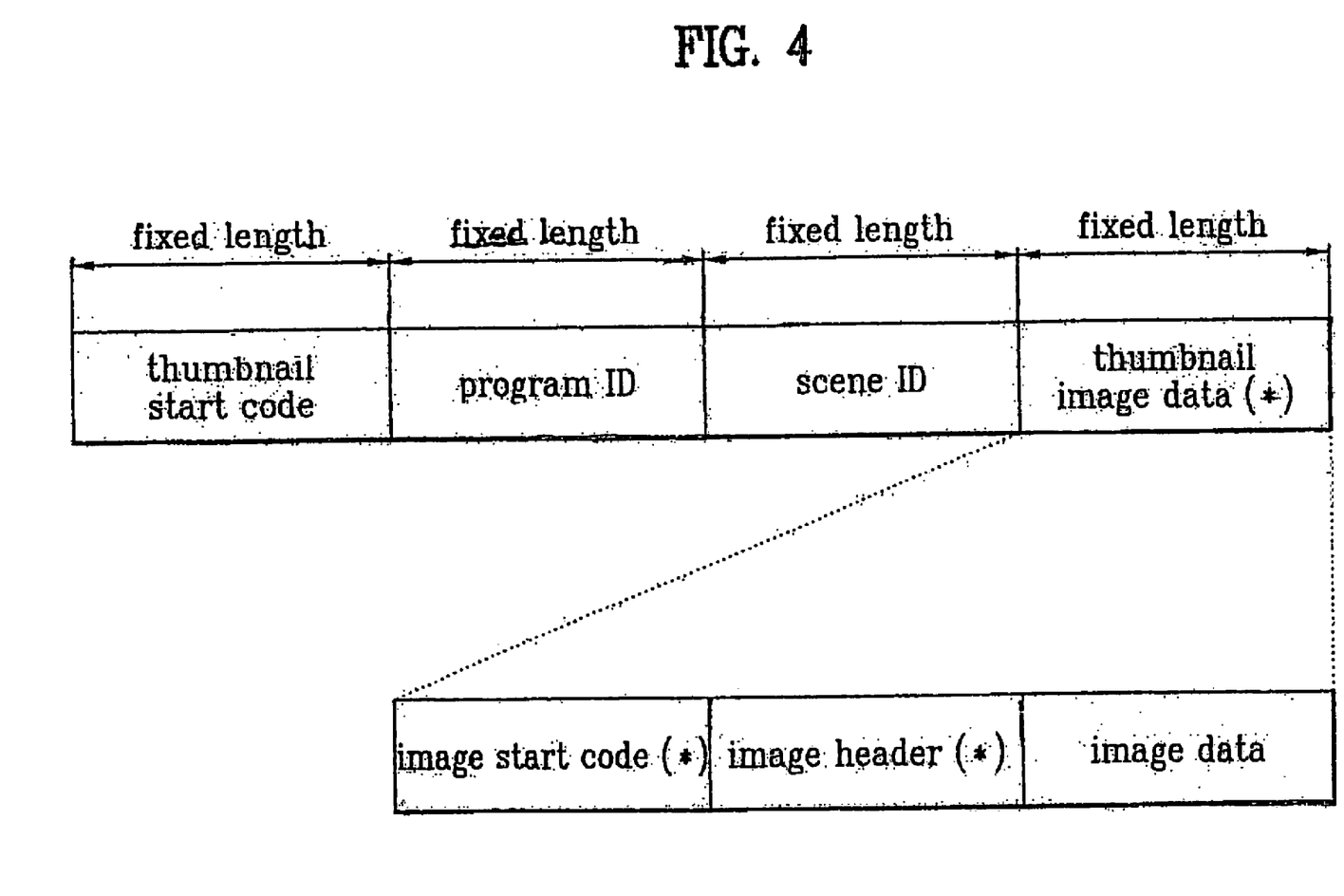
FIG. 4 is a structural diagram of a thumbnail stream packet for a thumbnail image service according to the present invention.

FIG. 4 is a structural diagram of a thumbnail stream packet for a thumbnail image service according to the present invention.

Referring to FIG. 4, one thumbnail stream packet includes a thumbnail start code, a program ID, a scene ID, and data including a real thumbnail image.

Each field has a fixed length. Namely, each field is constructed with a fixed number of bytes. Hence, complexity of a circuit for decoding a thumbnail image stream can be minimized.

The thumbnail start code has a unique value so that a thumbnail image stream can be separated from a transport stream. For instance, a thumbnail stream ID code can have a size of bits constructed with twenty-three sequential 0's, a bit having a value of '1', and 8-bits.

The program ID indicates that a currently transmitted thumbnail stream belongs to which broadcast program. For this, the program ID has a value coinciding with program ID information transferred by a data broadcast. Namely, auxiliary information for a program obtained from the data broadcast is made to coincide with the corresponding thumbnail image using the program ID.

The scene ID indicates a currently transferred thumbnail image is included in which scene within the program corresponding to the program ID. Hence, the scene ID can indirectly indicate a time point of display or decoding completion of a thumbnail image. Namely, the thumbnail image should be ready for use in the DTV or PVR system prior to the end of the corresponding scene.

A last field of the thumbnail stream packet is a part in which the real thumbnail image is included. In case that a broadcasting station directly produces a thumbnail image to transfer, the corresponding thumbnail image is included in the last field. The thumbnail image can be divided into several thumbnail stream packets to be transferred according to a situation. Hence, an image start code, as shown in FIG. 4, should be included in a packet having data corresponding to a start part of the thumbnail image, whereby it can be informed that the corresponding data is transferred for the thumbnail image for the first time. In doing so, image header information should be transferred as well.

Consequently, the image start code and image header information are transferred only once for each thumbnail image and the corresponding information is included in a first packet having the thumbnail image. The image header information includes basic information such as image resolution, image encoding format, and the like.

When the thumbnail image divided into a plurality of packets is transferred, the second to last packets do not include the image start code and image header information. And, the image data area includes the substantially encoded thumbnail image information.

In doing so, since the thumbnail image data filed in FIG. 4 has the fixed number of bytes, there may exist a remaining space after the last byte of the encoded image data has occurred in the last packet. Such a remaining space is filled with a null value. A portion indicated by '*' in FIG. 4 means the possibility of omission according to a situation.

Figure 5:
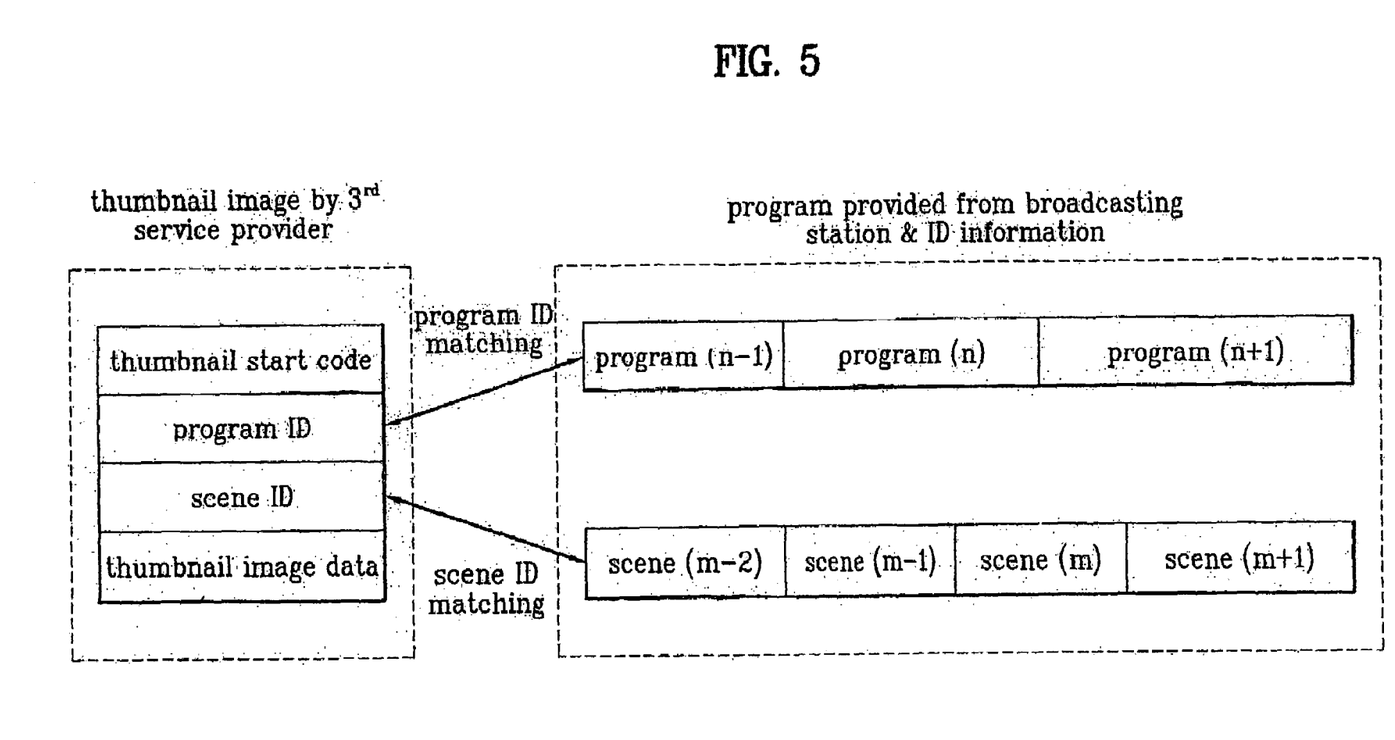
FIG. 5 is a diagram of program and scene ID matching between a broadcast stream and a thumbnail image stream of the thumbnail image system in FIG. 1B.

FIG. 5 is a diagram of a program and scene ID matching between a broadcast stream and a thumbnail image stream of the thumbnail image system in FIG. 1B.

Referring to FIG. 5, a broadcasting station should transfer scene ID information for a corresponding program to a receiver for the program and scene ID matching between a broadcast stream and a thumbnail image stream.

A basic data structure for transferring the scene ID information is as good as the data structure in FIG. 4. And, the broadcasting station, which does not transfer the thumbnail image, may include the scene ID information in the data stream to transfer.

A service provider, who is connected to the receiver such as DTV and PVR using a connecting means such as Internet, modem, and the like, transfers the thumbnail image via the connecting means. A thumbnail stream transferred by the service provider adopts the structure in FIG. 4 as well.

Consequently, the DTV or PVR system performs parsing on the program ID included in the thumbnail stream transferred from the service provider and a broadcast stream corresponding to a program transferred from the broadcasting station or a previously recorded program to match that the transferred thumbnail image corresponds to which program.

And, the DTV or PVR system matches the scene ID of the thumbnail stream and the scene ID information provided by the broadcasting station. Hence, the DTV or PVR system enables to implement the auxiliary function using the thumbnail image in a manner of matching the thumbnail image acquired from the service provider with the program provided from the broadcasting station.

In the thumbnail image broadcast service of the present invention, the broadcasting station and service provider should use the program ID and scene ID coinciding with each other, respectively. For this, after having received the program and scene information from the broadcasting station prior to generating the thumbnail image, the service provider enables to utilize a thumbnail image generating method based on the received information. Namely, the service provider can be provided with the program and scene ID information while receiving the corresponding program from the broadcasting station to generate the thumbnail image.

Accordingly, a user interface for the thumbnail image service can include the following steps.

First of all, a user receiver accesses a service provider server via Internet or the like and the service provider provides a program list including the thumbnail image to the user. After having selected a specific program from the program list provided from the service provider, the user downloads a corresponding thumbnail image stream. Subsequently, the user receiver matches a program stream with a corresponding thumbnail image stream and then utilizes the downloaded thumbnail image in configuring a description image of OSD or other programs.

Namely, the service provider transfers the thumbnail stream, whereas the broadcasting station transfers a data broadcast signal including the scene ID information or a thumbnail stream failing to include the thumbnail image therein. In doing so, the DTV or PVR system, as shown in FIG. 5, matches the thumbnail image with the real broadcast program using the program ID and scene ID information. Hence, the user of the DTV or PVR system acquires the thumbnail image from the broadcasting station or service provider to be provided with multiple services for the corresponding program as well as abbreviated information for the corresponding program.

Accordingly, the present invention is applicable to the broadcasting service, which demands for a contents summary and preview function for a broadcast program or multimedia stream, the representative image generation for a program, and the implicative information transfer of multimedia data, and its applied field corresponding to devices thereof, thereby enabling to effectively provide the thumbnail image to users.

And, the present invention reduces software and hardware loads put on thumbnail image extraction in the DTV or PVR system.

Moreover, the present invention lowers a price of the DTV or PVR as well as provides a high quality of service to a user.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital broadcast receiver comprising:
   a decoding device comprising:
      a system decoder demultiplexing broadcast streams to separate the broadcast streams into a video stream, a thumbnail image stream and an auxiliary data stream, wherein the thumbnail image stream includes a first program identifier (ID), a first scene ID, and a thumbnail image;
      a video decoder decoding the video stream and the thumbnail image stream; and
      a data decoder decoding the auxiliary data stream, the auxiliary data stream including a second program identifier (ID) identifying a specific program generated by the decoded video stream and a second scene ID identifying a specific scene of the specific program,
      wherein the decoding device is configured to match the first program ID with the second program ID and the first scene ID with the second scene ID; and
   a display unit displaying the thumbnail image generated by the decoded thumbnail image stream with a scene of the specific program upon matching the first program ID with the second program ID and the first scene ID with the second scene ID.

2. The receiver of claim 1, wherein the thumbnail image stream comprises a thumbnail start code field, a program ID field indicating the first program ID, a scene ID field indicating the first scene ID, and a data field comprising the thumbnail image.

3. The receiver of claim 2, wherein the data field comprises an image start code indicating a start of the thumbnail image and an image header indicating a coding type of the thumbnail image.

4. The receiver of claim 1, wherein the thumbnail image stream and the video stream are transmitted from different service providers.

5. The receiver of claim 4, wherein the thumbnail image stream is transmitted via Internet or a private line.

6. The receiver of claim 5, wherein the video stream is transmitted via a terrestrial wave, a satellite, or a cable.

7. The receiver of claim 1, wherein the thumbnail image stream and the video stream are transmitted from a same service provider.

8. The receiver of claim 7, wherein the same service provider is a broadcasting station.

9. The receiver of claim 1, wherein the thumbnail image is generated by a broadcasting station and the generated thumbnail image is encoded into the thumbnail image stream, the thumbnail image stream being multiplexed with the broadcast stream to be transmitted from the broadcasting station to the digital broadcast receiver.

10. The receiver of claim 1, wherein the thumbnail image stream includes one thumbnail image per scene.

11. The receiver of claim 1, wherein the thumbnail image stream includes one thumbnail image per scene group, the scene group comprising a plurality of scenes having similar features.

12. A thumbnail image receiving method in a digital broadcast receiver, the method comprising:

receiving broadcast signals;

demultiplexing the broadcast signals into a video stream transferring a specific program, a thumbnail image stream and an auxiliary data stream, wherein the thumbnail image stream includes a first program identifier (ID), a first scene ID, and a thumbnail image and the auxiliary data stream includes a second program ID identifying the specific program and a second scene ID identifying a specific scene of the specific program;

decoding the thumbnail image stream, the video stream and the auxiliary data stream;

matching the first program ID with the second program ID and the first scene ID with the second scene ID; and displaying the thumbnail image generated by the decoded thumbnail image stream with a scene of the specific program generated by the decoded video stream upon matching the first program ID with the second program ID and the first scene ID with the second scene ID.

13. The method of claim 12, wherein the thumbnail image stream comprises a thumbnail start code field, a program ID field indicating the first program ID, a scene ID field indicating the first scene ID, and a data field comprising the thumbnail image.

14. The method of claim 13, wherein the data field comprises an image start code indicating a start of the thumbnail image and an image header indicating a coding type of the thumbnail image.

15. The method of claim 12, wherein the thumbnail image stream and the video stream are transmitted from different service providers.

16. The method of claim 15, wherein the thumbnail image stream is transmitted via Internet or a private line.

17. The method of claim 16, wherein the video stream is transmitted via a terrestrial wave, a satellite, or a cable.

18. The method of claim 12, wherein the thumbnail image stream and the video stream are transmitted from a same service provider.

19. The method of claim 18, wherein the same service provider is a broadcasting station.

20. The method of claim 12, wherein the thumbnail image is generated by a broadcasting station and the generated thumbnail image is encoded into the thumbnail image stream, the thumbnail image stream being multiplexed with the broadcast stream to be transmitted from the broadcasting station to the digital broadcast receiver.

21. The method of claim 12, wherein the thumbnail image stream includes one thumbnail image per scene.

22. The method of claim 12, wherein the thumbnail image stream includes one thumbnail image per scene group, the scene group comprising a plurality of scenes having similar features.

* * * * *